US 6,563,904 B2

(12) United States Patent
Wijts et al.

(10) Patent No.: US 6,563,904 B2
(45) Date of Patent: May 13, 2003

(54) APPARATUS AND METHOD FOR DETECTING AND REMOVING UNDESIRABLE MATERIAL FROM WORKPIECES

(75) Inventors: Corneel Constant Wijts, Redmond, VA (US); Norman A. Rudy, Snohomish, WA (US); Morteza Safai, Seattle, WA (US); Arthur W. Vogeley, Seattle, WA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/727,729

(22) Filed: Dec. 1, 2000

(65) Prior Publication Data

US 2002/0067797 A1 Jun. 6, 2002

(51) Int. Cl.[7] .................. G01J 23/083; A22C 17/00; B26D 3/00; B26D 5/20; B26D 7/27
(52) U.S. Cl. .................. 378/58; 378/54; 452/150; 83/72; 83/932
(58) Field of Search ................ 378/58, 54; 452/149, 452/136, 150; 209/3.2, 3.3; 83/75.5, 76.6, 72, 76.8, 932

(56) References Cited

U.S. PATENT DOCUMENTS

| | | | | |
|---|---|---|---|---|
| 4,164,248 A | * | 8/1979 | Rysti | 83/521 |
| 4,256,569 A | * | 3/1981 | Wallace | 209/3.3 |
| 4,503,740 A | * | 3/1985 | Brand et al. | 83/521 |
| 4,576,071 A | * | 3/1986 | Rayment | 83/76.8 |
| 4,596,172 A | * | 6/1986 | Visser | 83/75.5 |
| 4,875,254 A | | 10/1989 | Rudy et al. | |
| 4,887,219 A | * | 12/1989 | Strauser | 83/76.6 |
| 4,934,228 A | * | 6/1990 | Bolton et al. | 83/23 |
| 4,962,568 A | | 10/1990 | Rudy et al. | |
| 4,970,757 A | | 11/1990 | Heiland et al. | |
| 5,042,341 A | * | 8/1991 | Greten et al. | 83/75.5 |
| 5,133,687 A | | 7/1992 | Malloy | |
| 5,142,955 A | * | 9/1992 | Hale | 83/75.5 |
| 5,162,016 A | | 11/1992 | Malloy | |
| 5,205,779 A | | 4/1993 | O'Brien et al. | |
| 5,324,228 A | | 6/1994 | Vogeley, Jr. | |
| 5,334,084 A | | 8/1994 | O'Brien et al. | |
| 5,444,635 A | * | 8/1995 | Blaine et al. | 83/75.5 |
| 5,450,333 A | | 9/1995 | Minami et al. | |
| 5,585,603 A | | 12/1996 | Vogeley, Jr. | |
| 5,772,040 A | * | 6/1998 | Tomiyama et al. | 209/3.3 |
| 5,847,382 A | | 12/1998 | Koch et al. | |
| 5,902,177 A | | 5/1999 | Tessier et al. | |
| 5,937,080 A | | 8/1999 | Vogeley, Jr. et al. | |
| 5,944,598 A | | 8/1999 | Tong et al. | |
| 6,129,625 A | | 10/2000 | Cate et al. | |
| 6,198,834 B1 | | 3/2001 | Belk et al. | |

FOREIGN PATENT DOCUMENTS

| | | | | |
|---|---|---|---|---|
| EP | 0 348 311 A1 | 12/1989 | | |
| EP | 0 819 381 A1 | 1/1998 | | |
| FR | 2713535 A1 | 6/1995 | | |
| GB | 2 214 294 | * 8/1989 | | 378/58 |
| GB | 2 285 126 | 6/1995 | | |

* cited by examiner

Primary Examiner—Drew A. Dunn
(74) Attorney, Agent, or Firm—Christensen O'Connor Johnson Kindness PLLC

(57) ABSTRACT

A conveyor (12) moves a workpiece (WP) past an x-ray source (14) to detect existence and location of any undesirable material included in the workpiece, such as bones, fat, metal, etc. Thereafter, the conveyor carries the workpiece further, wherein a cutter (22) segments the detected undesirable material from the workpiece into a segmented portion (SP) having a visually distinguishable shape, such as square, round, triangular, etc. A worker stationed downstream of the cutter along the conveyor may then easily spot the segmented portion (SP) in a distinguishable shape and offload the segmented portion from the conveyor, while leaving the rest of the workpiece (WP) on the conveyor for further processing. Alternatively, a pickup device (24) may be used to automatically offload the segmented portion from the conveyor. A computer (18) keeps track of the locations of the workpiece and the segmented portion at all times.

33 Claims, 7 Drawing Sheets

APPARATUS AND METHOD FOR DETECTING AND REMOVING UNDESIRABLE MATERIAL FROM WORKPIECES

FIELD OF THE INVENTION

This invention relates generally to systems and methods for processing workpieces, and more specifically, to an apparatus and method for detecting and removing undesirable material from workpieces that are carried on a conveyor.

BACKGROUND OF THE INVENTION

The processing of meat, poultry, fish, and other food products has traditionally been a labor-intensive endeavor. In an effort to streamline operations, many food processors have turned to automated systems for detecting and removing undesirable material from food products, such as bones, fat, metal, glass, plastic, etc. For example, U.S. Pat. No. 4,970,757 to Heiland et al. describes an apparatus for automatic excision of bone from meat. The apparatus optically detects the location of bone in meat, and uses the location information to control a high-pressure water jet to automatically remove the bone. U.S. Pat. No. 5,334,084 to O'Brien et al. describes an apparatus for automatically trimming fatty tissue from animal carcasses. X-ray tubes are used to scan carcasses to obtain the width and location of fat seams. This information is input to a computer, which creates cutting paths for controlling a cutting device to segment the fatty tissue from the carcass. U.S. Pat. No. 5,902,177 to Tessier et al. describes an apparatus for automatically removing ribs from a flank. The apparatus uses an x-ray imaging unit to scan a flank to measure the thickness of ribs, and uses the thickness data to derive programmed cut data for controlling a cutting device to segment the ribs from the flank.

All of these systems process scanning data to obtain elaborate cutting paths for controlling a cutting device to segment undesirable material along its outline shape. Thus, the data processing involved is relatively complex, depending on the shape of the undesirable material, and, further, the controlled movement of the cutting device becomes complex to accurately trace the outline of the undesirable material. While these complex systems are certainly beneficial, they are expensive to install and operate.

There is an additional disadvantage associated with the existing systems. After undesirable material is segmented from a food product, both the segmented material and the food product are still carried on a conveyor in a mixture. The existing systems do not have any reliable mechanism for automatically offloading segmented undesirable material from a conveyor so that only the food products free from any undesirable material will continue on the conveyor for further processing, sorting, etc. Typically, segmented material is offloaded from the conveyor by hand to be placed on a separate take-away conveyor for transport to another location, perhaps to a discard bin. The manual offloading of segmented material is often unsatisfactory because it is difficult for the worker to visually distinguish segmented material from the rest of the workpieces repeatedly and for long duration with any accuracy. The difficulty is often exacerbated because processing of food products, especially fish, poultry, or meat, typically occurs at relatively low temperatures, in the range of 40 degrees. Performing the same repetitive offloading tasks in this cold environment can lead to physical ailments as well as create an undesirable work environment.

The present invention is directed to detecting and removing undesirable material from workpieces, including food products, which do not require relatively complex processing of scanned data or controlling of a cutting device. In addition, the present invention is capable of automatically offloading segmented undesirable material from a conveyor. Alternatively, the present invention is capable of rendering the segmented undesirable material visually distinguishable from the rest of the workpieces so as to minimize the mental and physical burden on the worker manually offloading the undesirable material.

SUMMARY OF THE INVENTION

The invention provides a method and system of detecting material desired to be removed from a workpiece that is carried on a conveyor. According to a first embodiment of the method, the workpiece is positioned adjacent a scanner and is scanned. Next, based on the scanning, it is determined whether the workpiece includes any undesirable material within. If so determined, a portion of the workpiece that contains the undesirable material is segmented into a visually recognizable shape, such as round, square, and triangular shapes. A worker stationed downstream along the conveyor can easily distinguish such segmented portion having a recognizable shape and remove it from the conveyor.

The present invention segments an undesirable material from a workpiece into a simple shape, instead of elaborately segmenting an undesirable material along its outline. Thus, the invention does not require relatively complex processing of scanned data or complex controlling of a cutting device.

In accordance with a further aspect of the invention, the location of the workpiece and the location of the segmented portion including undesirable material on the conveyor are tracked at all times. The location information may be used to automatically offload the segmented portion from the conveyor using a pickup device. The pickup device may then deposit the segmented portion onto a separate take-away conveyor for transport to a desired location. When a pick up device is used for automatic offloading, a portion containing undesirable material does not necessarily have to be segmented into a visually recognizable shape, because in this case manual labor will not be relied upon to offload the segments containing undesirable material.

In accordance with another aspect of the invention, an x-ray source is used as a scanner. An array of x-ray detectors is used to detect an intensity (or attenuation) of x rays after they have passed through the workpiece. The existence of an undesirable material is determined based on the detected attenuation of the x rays.

In accordance with yet another aspect of the present invention, an x-ray source and a camera, for example, a CCD (charge-coupled device), CID (charge injection device), or infrared (IR) camera, are combinedly used as a scanner. The thickness of a workpiece carried on a conveyor is measured. For portions of the workpiece that have a thickness above a predetermined value, undesirable material is detected based on the x-ray scanning. For portions of the workpiece that have a thickness below a predetermined value, undesirable material is detected using an image of the workpiece taken by the camera. This embodiment is useful for detecting undesirable material in young chicken breasts, for example, wherein both bone and meat portions have similar mass density values and thus x-ray scanning may not be effective in differentiating between the two, particularly in thin portions.

In accordance with still another aspect of the invention, a detected undesirable material may be cut out from the workpiece using a high-speed water jet, a laser, a rotary saw, a hacksaw, a guillotine, or a bandsaw.

According to a second embodiment of a system and method of the present invention for detecting material desired to be removed from a workpiece, first, a workpiece is positioned adjacent a scanner and is scanned. Then, existence of undesirable material in the workpiece is determined based on the scanning. Thereafter, if it is determined that undesirable material exists, the workpiece is marked with a visually recognizable sign. For example, a V-shaped notch may be cut out from the workpiece using a high-speed water jet. A worker working downstream of the conveyor may easily recognize the marked workpiece and remove it from the conveyor. Preferably, the worker deposits the removed workpiece onto a separate take-away conveyor for transport to another location, where a skilled worker may manually remove undesirable material from the workpiece.

According to a third embodiment of a system and method of the present invention for detecting material desired to be removed from a workpiece, first, a workpiece is positioned adjacent a scanner and is scanned. Then, based on the scanning it is determined if undesirable material exists within the workpiece. At the same time, the location of the workpiece on the conveyor is tracked. If it is determined that the workpiece includes undesirable material, the workpiece is automatically removed from the conveyor based on the known location of the workpiece. The removed workpiece may then be automatically deposited onto a separate take-away conveyor for transport to another location, where a skilled worker may manually remove undesirable material from the workpiece.

According to the first embodiment of the present invention, undesirable material is segmented into a visually recognizable shape, which minimizes the mental and physical burden on a worker in manually separating and removing segmented portions from the conveyor. This advantage is also provided by the second embodiment of the present invention, which marks a workpiece containing undesirable material with a visually recognizable sign so that a worker may easily pick out and remove the workpiece from the conveyor for further processing. Still further, in accordance with the present invention, segmented undesirable material or a workpiece determined to include undesirable material may be automatically offloaded from the conveyor. This eliminates the need to have workers stationed by the conveyor for the purpose of sorting and offloading segments or workpieces, which is highly desirable especially when the workpiece processing is carried out in a hazardous or uncomfortable, for example, a cold-temperature environment.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
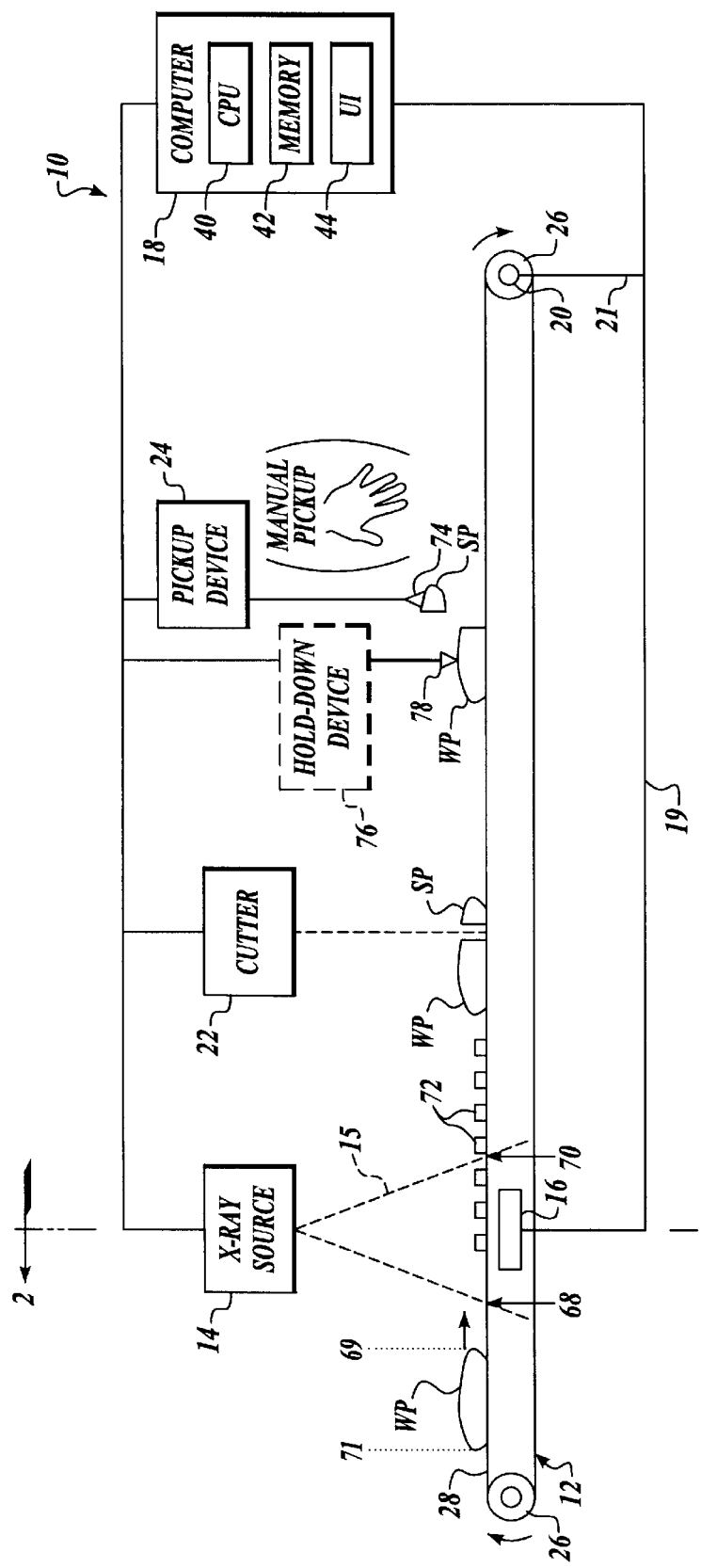
FIG. 1 is a schematic representation of a first embodiment of an apparatus and method for detecting and removing undesirable material from workpieces in accordance with the present invention.

FIG. 1 illustrates a first embodiment of an apparatus and method of detecting and removing undesirable material from a workpiece, in accordance with the present invention. In one embodiment, the present invention utilizes x rays to inspect workpieces, including food products, to determine if they include any undesirable material, such as bones, fat, metal, plastic, glass, etc. Generally, x rays are attenuated as they pass through an object in proportion to the total mass of the materials through which they pass. The intensity of x rays received at an x-ray detector after they have passed through an object is therefore inversely proportional to the density of the object. For example, x rays passing through a chicken bone, which has a relatively higher density, will be more attenuated than x rays that pass through the meat of the chicken, which has a relatively lower density. Thus, x rays are suited for inspecting workpieces to detect the existence of any undesirable material having specific density or x-ray modification characteristics. A general description of the nature and use of x rays in processing workpieces can be found in U.S. Pat. No. 5,585,603, incorporated herein by reference.

A detection apparatus 10 includes a conveyor 12 for carrying workpieces. In the present description, the terms "upstream" and "downstream" are used with respect to the direction of movement of the conveyor 12. The detection apparatus 10 further includes an x-ray source 14 for emitting x rays 15 toward a workpiece (WP) carried on the conveyor 12. An array of x-ray detectors 16 is located adjacent the conveyor 12 for receiving the x rays that have passed through the workpiece when the workpiece is placed within the scope of the x rays 15. Each of the x-ray detectors in the array 16 generates a signal corresponding to an intensity of the x rays impinging upon the x-ray detector. The signals generated by the x-ray detector array 16 are transmitted to a computer 18 via a bus line 19. The computer 18 processes these signals to determine the existence and location of any undesirable material present in the workpiece. The detection apparatus 10 further includes a position sensor 20 that generates a position sensor signal indicative of a position of the workpiece along the length of the conveyor 12 as the workpiece is moved on the conveyor 12 with respect to the rest of the detection apparatus 10. The position of the workpiece with respect to the conveyor belt itself is fixed. (The position of the workpiece along the transverse width of the conveyor 12 is provided by the x-ray detector array 16.) The position sensor signal is also transmitted to the computer 18 via a bus line 21, and the computer 18 processes the signal to track the location of the workpiece at all times, if desired.

The detection apparatus 10 further includes a cutter 22, and optionally a pickup device 24, both located adjacent the conveyor 12. As described above, the computer 18 determines the existence and location of any undesirable material in the workpiece while tracking the location of the workpiece itself as it is carried on the conveyor 12. Based on these data, when the workpiece is moved on the conveyor 12 to be adjacent the cutter 22, the computer 18 controls the cutter 22 to automatically segment a portion of the workpiece that contains the undesirable material into a visually recognizable shape, such as round, square, triangular, etc. Then, the worker stationed downstream along the conveyor 12 may easily spot these segmented portions (SP) and manually remove them from the conveyor 12 for discard or further processing. Alternatively, the computer 18 may control the pickup device 24, while tracking the location of the workpiece on the conveyor 12, to automatically offload the segmented portion (SP) from the conveyor 12. The pickup device 24 may then deposit the removed segmented portion (SP) onto a separate take-away conveyor (not shown) for transport of the segmented portion to a desired location, perhaps to a discard bin.

The present invention optionally segments undesirable material from a workpiece into a simple shape, such as round, square, triangular; it does not necessarily endeavor to segment undesirable material precisely along its outline. Thus, the invention does not require relatively complex processing of scanned data or complex controlling of a cutting device. Further, since undesirable material is segmented into a visually recognizable shape, the mental and physical burden on a worker manually separating and removing segmented portions from the conveyor is minimized. Still further, offloading segmented portions from the conveyor may be performed completely automatically using a pickup device, eliminating the need for manual intervention.

It is noted that when the pickup device 24 is provided and used for automatically offloading a segmented portion (SP), it is not necessary to form a segmented portion (SP) in a visually recognizable shape because in this case manual labor will not be relied upon to spot and offload segmented portions (SP). Therefore, when the pickup device 24 is used, the cutter 22 may take various cutting paths as long as the path completely removes undesirable material from the workpiece. For example, the cutter 22 may follow the outline of the detected undesirable material.

Each component of the detection apparatus 10 is now described in greater detail. Still referring to FIG. 1, the conveyor 12 includes conveyor rollers 26 and a conveyor belt 28 constructed in a standard manner. The conveyor belt 28 is made of material that is permeable to x rays, such as rubber or plastic. Because of this construction, x rays easily pass through the conveyor belt 28 to impinge upon the x-ray detector array 16 disposed beneath the conveyor belt 28. The conveyor 12 may be moved continuously or in steps. Further, for the purpose of the present invention, the conveyor 12 could be replaced with moving platforms for carrying workpieces, or hooks that suspend workpieces above a processing area. In these alternative embodiments, the x-ray source 14 and the x-ray detector array 16 could be horizontally disposed from each other, rather than vertically.

Figure 2:
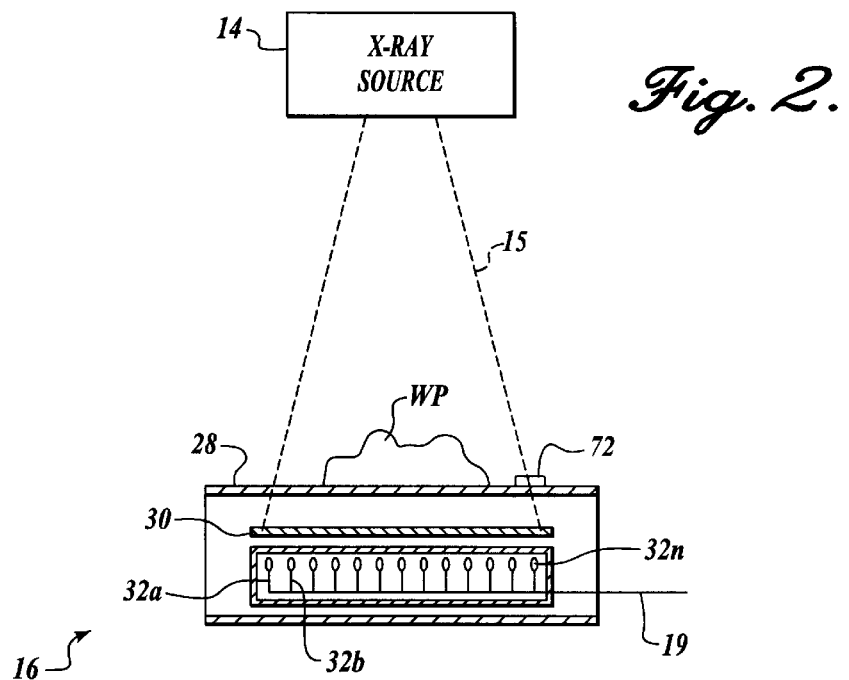
FIG. 2 is a cross-sectional view of a conveyor and an array of x-ray detectors, taken from FIG. 1.

The construction of the x-ray source 14 and the x-ray detector array 16 can be more readily appreciated by reference to FIG. 2, which shows a cutaway view of the detection apparatus 10 as viewed along the conveyor 12 (an end view of the conveyor 12). The x-ray detector array 16 includes a layer of scintillator material 30 and a plurality of photodiodes 32a–32n. The x-ray source 14 is located at a sufficient distance from the conveyor belt 28 so that the x rays 15 emitted from the x-ray source 14 completely encompass the width of the x-ray detector array 16. The x rays 15 pass through a workpiece (WP), through the conveyor belt 28, and impinge upon the layer of scintillator material 30. Since the photodiodes 32a–32n respond only to visible light, the scintillator material 30 is used to convert the x-ray energy impinging thereupon into visible light flashes that are proportional to the strength of the received x rays. The photodiodes 32 generate electrical signals having an amplitude proportional to the intensity of the light received from the scintillator material 30. The electrical signals are then relayed on the bus line 19 to the computer 18.

While the illustration shows a line of photodiodes arranged across the width of the conveyor belt 28 for detecting x rays passing through a "slice" of a workpiece, alternative photodiode layouts are of course possible. For example, photodiodes may be positioned in several rows or in a square grid to increase the scanning area of the x-ray detector array 16.

Figure 3:
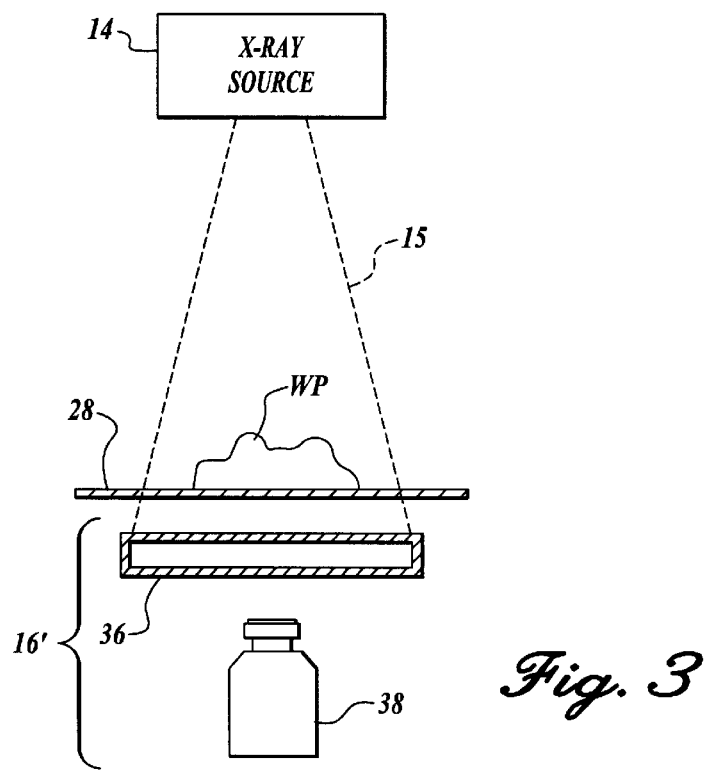
FIG. 3 is a cross-sectional view of an alternative system for x-ray detection.

Other embodiments of the x-ray detector array 16 are possible, as long as the x-ray detector array 16 is adapted to detect the intensity (or attenuation) of x rays that have passed through a workpiece to determine the existence of any undesirable material within the workpiece. For example, referring to FIG. 3, an alternative embodiment of an x-ray detector array 16' includes a fluoroscope screen 36 and a video camera 38. When the x rays 15 impinge on the fluoroscope screen 36, the screen is activated to produce light flashes in proportion to the attenuation of the impinging x rays. The light flashes are then recorded on the video camera 38, or any other device capable of capturing the "picture" produced by the fluoroscope screen 36. The image captured by the video camera 38 is then transmitted to the computer 18 and converted into digital values related to the intensity of light generated by the fluoroscope screen 36. Further alternatively, direct flat-panel x-ray imaging technology or direct radiography may be used. For example, an array of amorphous selenium detectors may be used as an x-ray detector array 16 to directly detect the intensity of the impinging x rays and to transmit the intensity signal to the computer.

Further alternatively, it is noted that other types of scanning devices may be used in place of the x-ray source 14 and the x-ray detection array 16. For the purpose of the present invention, any scanning device that can discern any undesirable material from the rest of the workpiece may be used. Typically, such scanning device includes both a generator to irradiate a workpiece with radiation and a receiver to receive the radiation that has passed through the workpiece and been thereby attenuated or otherwise modified. The generator and receiver portions may be integrally or separately formed. For example, an infrared radiation generator may be used together with an infrared radiation sensor. As a further example, video cameras that view a workpiece as illuminated by one or more light sources may be used, as described in U.S. Pat. Nos. 5,324,228 and 5,937,080, which are herein incorporated by reference. As a specific example, an x-ray source and a camera may be combinedly used as a scanner to draw advantages of both. This application will be more fully described below in reference to FIG. 6. The information obtained by any of these various scanning devices, or by any combinations thereof, about the presence and location of undesirable material in a workpiece will then be transmitted to the computer 18 and processed further, similarly as in the case of scanning using x rays.

The computer 18 includes a central processing unit (CPU) 40, a memory 42, and a user interface (UI) 44, for example, a control panel and a display. Collectively, these devices will store and process the intensity or attenuation information transmitted from the x-ray detection array 16. The computer 18 also controls the operation of the conveyor 12, the cutter 22, the pickup device 24, and optionally the x-ray source 14. As will be apparent to those skilled in the art, any processing or controlling operation may be performed by a single computer, or by a plurality of networked computers in a distributed manner, and the term "computer 18" is used herein to cover various arrangements of one or more computers.

Figure 4:
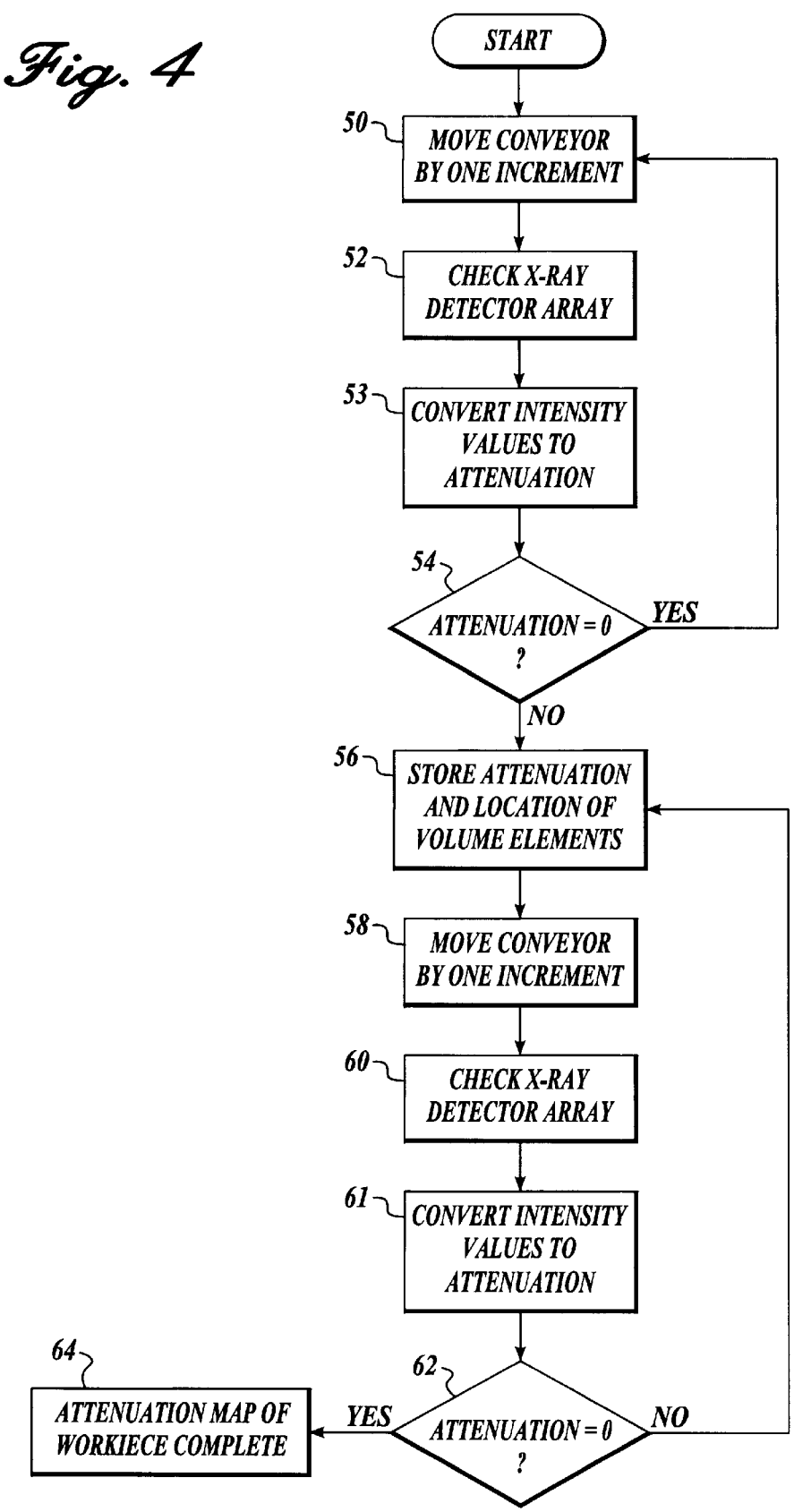
FIG. 4 is a flowchart of a computer program for processing x-ray detector signals and position sensor signals to create an attenuation map for determining the existence and location of undesirable material in a workpiece.

FIG. 4 illustrates the steps taken by the computer 18 to process the information obtained from the x-ray detection array 16 to ascertain the existence and location of any undesirable material included in a workpiece. These steps are loaded onto the memory 42 of the computer 18 as computer-executable instructions so that the CPU 40 can perform them automatically. In step 50, the conveyor 12 is moved by one increment. Next, in step 52, the x-ray detector array 16 is checked and the intensity values detected by the array 16 are conveyed to the computer 18. In step 53, the intensity values are converted into attenuation values, i.e., the extent to which the x rays that pass through the workpiece have been attenuated. In decision step 54, it is determined if the attenuation of x rays is zero for the entire x-ray detector array 16. If so, that means that the x rays have passed through nothing, or that there is no workpiece placed in the path of the x rays. Then, returning to step 50, the conveyor 12 is moved by another increment, the x-ray detector array 16 is checked (step 52) again, and the detected intensity values are converted into attenuation values again (step 53). If at decision step 54 it is determined that at least one of the x-ray detectors in the array 16 detected some attenuation of x rays, then in step 56 the detected attenuation values will be recorded together with the locations of where the attenuation values are detected.

Figure 5:
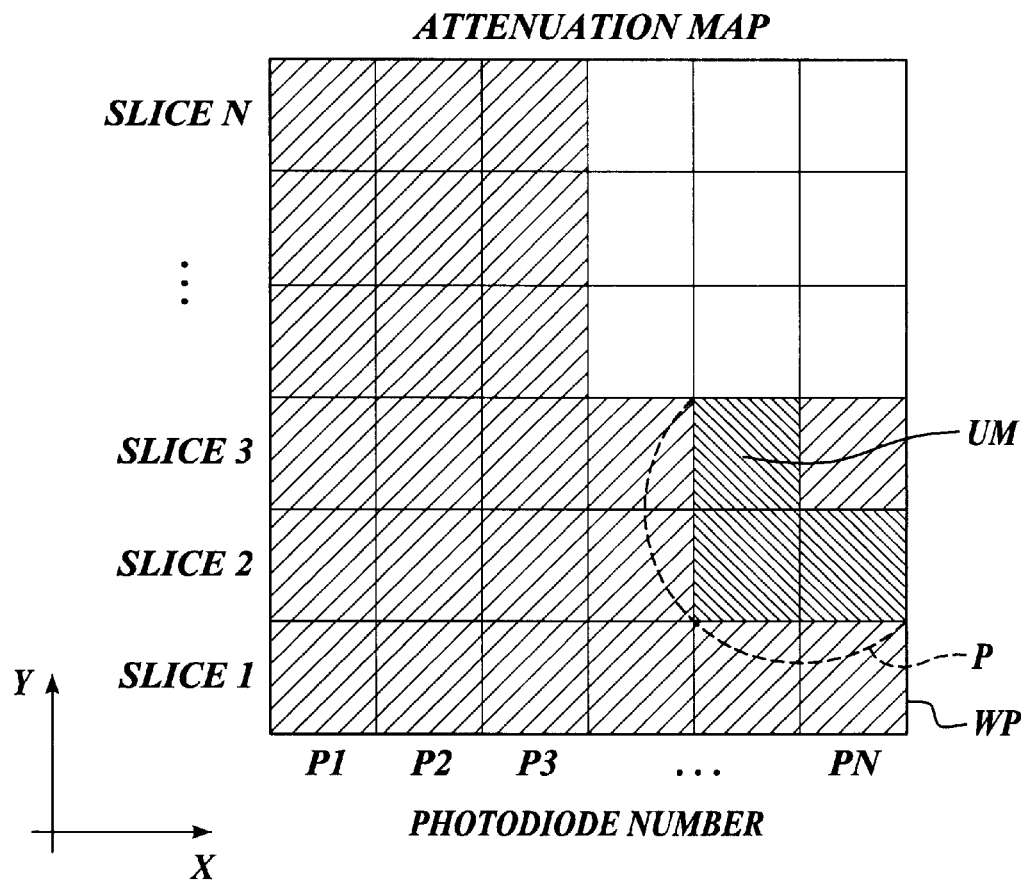
FIG. 5 is a sample attenuation map generated in accordance with the present invention.

In this regard, the x-ray attenuation and location are recorded using an attenuation map, for example, as shown in FIG. 5. To create an attenuation map, the computer virtually divides each workpiece undergoing the x-ray source 14 into a plurality of volume elements that extend along the direction of the x rays 15. Each volume element corresponds to each x-ray detector (or a photodiode) within the array 16; each x-ray detector detects the attenuation of the x rays that have passed through the corresponding volume element. In FIG. 5, the x-axis represents photodiode numbers P1 through Pn, and the y-axis represents workpiece slice numbers 1 through N. Each square (or pixel) indicates a volume element. After attenuation values are determined and recorded for slice 1 based on the detection by photodiodes P1–Pn, the conveyor 12 is moved by the thickness of the slice (or by one increment) and attenuation values are determined and recorded for slice 2 based on the detection by photodiodes P1–Pn, then for slice 3, and so forth. In FIG. 5, some attenuation is recorded for a generally L-shaped region, indicating the overall shape of a workpiece (WP). Within the workpiece (WP), relatively greater attenuation is recorded in a smaller L-shaped region, indicating the outline shape of undesirable material (UM). As will be apparent, those skilled in the art may readily correlate certain attenuation (or intensity) values with the existence of certain undesirable materials, such as bones, fat, glass, plastic, metal, etc. The correlation may be predetermined and loaded into the memory 42 of the computer 18 so that the computer 18 can detect the existence of various undesirable materials based on the attenuation values detected by the x-ray detectors 16.

Correlation between attenuation values and the existence of undesirable materials becomes most reliable when workpieces being processed all have a substantially universal thickness along the direction of x rays. This is not always the case. If considerable thickness variation exists among workpieces or within a workpiece, certain scanning techniques may be used to also determine the thickness of a workpiece so that the computer 18 can take into account the determined thickness when identifying any undesirable material within a workpiece. One method of discerning areas of thick and thin meat regions and producing a thickness map can be found in U.S. Pat. No. 5,324,228, incorporated herein by reference. Alternatively, various methods of processing the attenuation map may be used that rely on detecting differences in attenuation between adjacent elements in the attenuation map.

Referring back to FIG. 4, once attenuation values are recorded for all volume elements within a slice of the workpiece (step 56), next in step 58, the conveyor 12 is moved by one increment (by the thickness of a workpiece slice). In step 60, the x-ray detector array 16 is checked, and the intensity values detected for the new slice of the workpiece are conveyed to the computer 18. In step 61, the intensity values are converted into attenuation values. In decision step 62, it is determined if the attenuation of x rays is zero for all the x-ray detectors in the array 16. If not, that means that the workpiece being scanned is still continuous, so, returning to step 56, the attenuation values and their locations of detection for this new slice are recorded into the attenuation map of the workpiece. Thereafter, the conveyor 12 is incremented again (step 58), and for yet another slice of the workpiece, the x-ray detector array 16 is checked (step 60) and the detected intensity values are converted into attenuation values (step 61). If at decision step 62 it is determined that the attenuation of x rays is zero for all the x-ray detectors in the array 16, that means that the workpiece has left the scope of the x rays 15. At this point, the attenuation map for the workpiece is complete (step 64). The attenuation map is stored in the memory 42 of the computer 18 for further processing of the workpiece, such as segmenting undesirable material from the workpiece.

The thickness of a conveyor increment, or a workpiece slice to be scanned at each increment, may be changed depending on the desired level of resolution of the resulting attenuation map. A smaller conveyor increment or a slower conveyor speed provides greater resolution in determining the location of an undesirable material with greater accuracy. A larger conveyor increment or a faster conveyor speed provides lower resolution and less accuracy of the resulting attenuation map, but perhaps increases throughput.

The array of x-ray detectors 16 should ideally measure the attenuation of x rays that propagate in a uniformly thick slice downwardly. However, since x rays 15 are emitted from the x-ray source 14 in generally a cone shape, they will diverge with increasing distance from the source. As a result, the signal produced by the x-ray detector array 16 represents the intensity of x rays that have passed through a wedge-shaped slice of the workpiece having a thin side facing the x-ray source 14 and a thicker side facing the x-ray detector array 16. Although the wedge shape of the slice introduces a slight error in detecting the existence and location of undesirable material, this error is minimized using two techniques. First, the x-ray source 14 is placed sufficiently far away from the workpiece (WP) so that the x rays that pass through the workpiece are substantially vertical and in parallel alignment with each other. Second, the computer program is designed to take into account the effect of the geometric approximation (between the wedge shape and the equal-thickness slice shape) when processing the signal from the x-ray detector array 16. Both of these techniques greatly decrease the parallax error.

As described above, use of x rays to detect undesirable material in a workpiece is based on the principle that maximum absorption of x rays occurs in undesirable material (for example, bones) while maximum penetration of x rays occurs through portions of a workpiece without any defects (for example, meat). However, in some workpieces, for example in young chickens, bones are not fully calcified and thus their mass density is very close to the mass density of desirable meat portions. As such, bones in thinner portions of a workpiece appear "transparent" to x rays and defy x-ray detection. To address this situation, according to the present invention, an x-ray source and a camera may be combinedly used as a scanner to detect undesirable material in thick and thin portions alike, respectively. A camera is effective in detecting undesirable material, such as bones, in thinner portions of a workpiece because there typically is residual blood stored in bones. The blood darkens the bones in color and renders them readily detectable by a camera in thin portions of a workpiece. Various cameras may be used for this purpose, including an infrared camera. An infrared camera may be used to detect bones in thin portions of a workpiece based on that bones absorb more infrared radiation than meat portions, or alternatively based on that bones tend to absorb more heat than meat portions. Based on the latter principle, an infrared camera can readily discern bones from meat portions according to their temperature differences.

Figure 6:
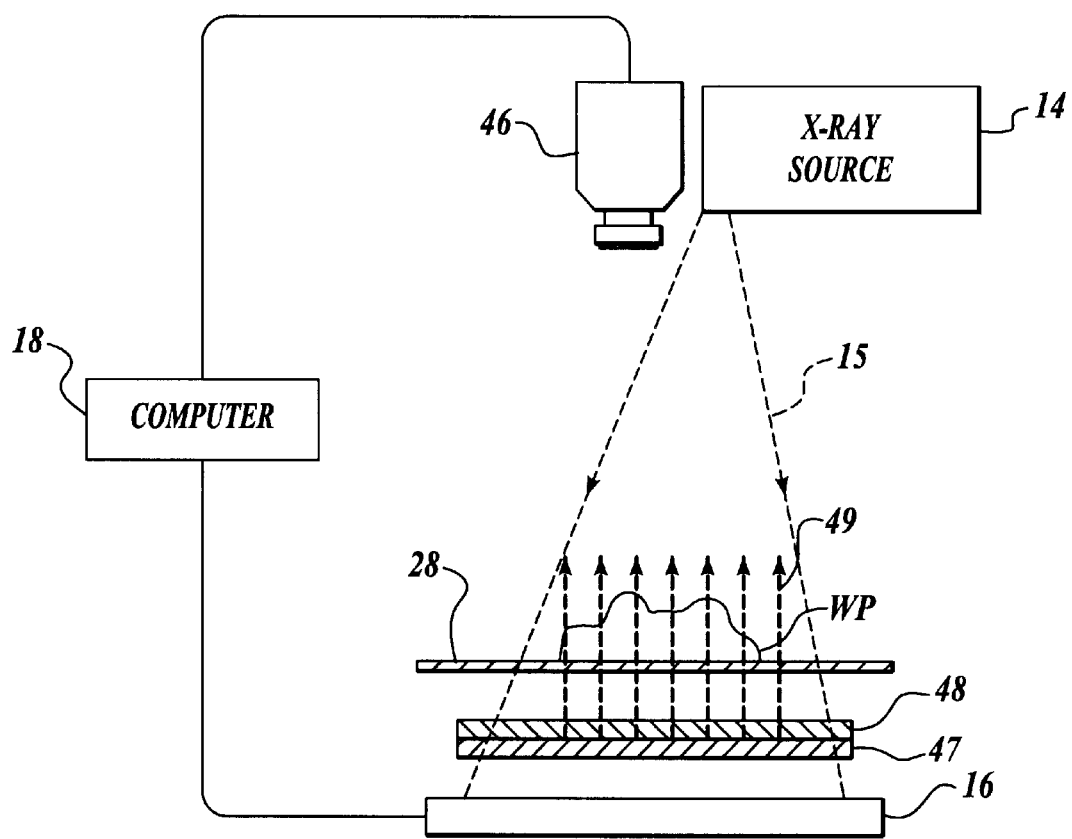
FIG. 6 is a schematic, cross-sectional view of an alternative scanner system including both an x-ray source and a camera.

Specifically, referring to FIG. 6, an x-ray source 14 and a camera 46, for example a charge-coupled device (CCD) or charge injection device (CID) or infrared (IR) camera, may be arranged together. As before, x rays 15 from the x-ray source 14 pass through a workpiece (WP) carried on a conveyor belt 28 and the attenuation of the x rays is detected by an x-ray detector array 16. The detected attenuation signals are transmitted to a computer 18 for further processing. The camera 46 takes an image of the workpiece (WP) using visible or nonvisible (infrared, for example) radiation and the image is also transmitted to the computer 18 for further processing. To make bone-meat contrast more "visible" to the camera 46, preferably, a radiation source 47 (or specifically an infrared radiation source 47 in the case of an IR camera) is provided to backlight the workpiece (WP). When an IR camera 46 is used to detect the temperature differences within a workpiece, the infrared radiation source 47 also serves as a heat source. Further, an optical transmission filter 48 can be provided between the radiation source 47 and the workpiece (WP) to pass only a narrow bandwidth of radiation 49 therethrough, which has an optimal transmission coefficient through meat portions of a workpiece, i.e., which optimally transmits through meat portions while being absorbed by bone portions. The conveyor belt 28 or any equivalent thereof is constructed of material that is transparent to such radiation 49 (visible or nonvisible) so that the radiation 49 reaches the workpiece (WP). Also, the camera 46 can include an optical receiver filter (not shown), which discriminates between signals that have passed through the workpiece (WP) and any background radiation and passes only the former to be received by the camera 36.

In operation, as a workpiece (WP) is carried on a conveyor, x-ray scanning is performed and x-ray attenuation signals are sent to the computer 18. Also, an image of the workpiece (WP) is taken by the camera 46 and is sent to the computer 18. In the computer, a thickness of the workpiece is first determined. This may be done based on the x-ray attenuation signals received from the x-ray detector array 16, by detecting differences in attenuation between adjacent elements in an attenuation map. Alternatively, a thickness of the workpiece may be determined based on the image taken by the camera 46, as described in U.S. Pat. No. 5,324,228 incorporated hereinabove. Next, for a portion determined to have a thickness above a predetermined value, the detected x-ray attenuation signals are used to detect undesirable material. For a portion determined to have a thickness below a predetermined value, the image taken by the camera 46 is used to detect undesirable material. As will be apparent to those skilled in the art, the predetermined thickness values vary depending on the type of workpieces being processed, and will be readily ascertainable depending on each application. The combination of radiography based on detection of x-ray absorption through thick portions and videography or thermography based on detection of chromatic or temperature variation in thin portions of a workpiece allows for detection of small bone fragments and other undesirable material in both thick and thin portions of a workpiece.

Referring back to FIG. 1, the position of the workpiece (WP) as it is carried on the conveyor belt 28 is monitored by the position sensor 20 at all times. In the illustrated embodiment, the position sensor 20 is formed of a rotary encoder attached to the conveyor roller 26. As known in the art, the rotary encoder tracks the movement of the conveyor belt 28 regardless of the speed at which the belt 28 is moving. The signal from the rotary encoder is transmitted to the computer 18 via the bus line 21. At the same time, when the computer 18 first receives signals from the x-ray detector array 16 indicating x-ray attenuation, the computer 18 recognizes that a workpiece has entered the scope of the x rays 15. The computer then assigns the position on the conveyor belt 28 corresponding to an upstream edge 68 of the scope of the x rays 15 as a downstream edge 69 of the workpiece. Similarly, when the computer 18 first receives signals from the x-ray detector array 16 indicating no x-ray attenuation after having detected some x-ray attenuation, the computer 18 recognizes that the workpiece has left the scope of the x rays 15. At this point, the computer assigns the position on the conveyor belt 28 corresponding to a downstream edge 70 of the scope of the x rays 15 as an upstream edge 71 of the workpiece. Once the position of the workpiece is thusly determined with respect to the conveyor belt 28, the computer 18 may track the location of the workpiece at all times as it is transported on the conveyor belt 28.

A position sensor may take various other forms. For example, instead of a rotary encoder, the conveyor 12 may include a series of markings 72 that are impervious to x rays arranged on the conveyor belt 28 at regularly spaced intervals. When the markings 72 are placed along a longitudinal edge of the conveyor belt 28, as best illustrated in FIG. 2, the markings 72 will not interfere with the detection of an undesirable material within a workpiece carried on the conveyor belt 28. The markings 72 along the belt edge would prevent the x rays from reaching the x-ray detector array 16. The motion of the conveyor belt 28 would therefore produce a series of x-ray pulses, wherein a segment of the x-ray detector array 16 will detect x-ray radiation and no x-ray detection (beneath the markings 72), alternately. By tracking the x-ray pulses, the computer 18 can track the movement of the conveyor belt 28 regardless of the speed at which the belt 28 is moving. Further, by determining the position of a workpiece with respect to the conveyor belt 28, similarly as in the case of the rotary encoder discussed above, the computer 18 may track the location of the workpiece at all times as it is transported on the conveyor belt 28.

The cutter 22 may be any suitable means for cutting a workpiece, such as a high-speed water jet, a laser, a rotary saw, a hacksaw, a guillotine, and a bandsaw. The computer 18 can control a cutting path of the cutter 22 so as to automatically segment a portion of a workpiece containing undesirable material into a visually recognizable shape, based on the known location of the workpiece and the location of the undesirable material within the workpiece. For example, referring again to FIG. 5, when an L-shaped portion of undesirable material (UM) is detected, the computer 18 defines an arc-like path (P) that completely encloses the undesirable material, and directs the cutter 22 to cut along the path (P) to produce a generally circular segmented portion (SP). As noted above, however, a segmented portion (SP) does not necessarily have to be in a visually recognizable shape when the pickup device 24 is provided and used for automatically offloading the segmented portion (SP) containing undesirable material. In any event, cutting devices suitable for use in the present invention are described in U.S. Pat. Nos. 4,875,254; 4,962,568; 5,868,056; 5,931,178; and 5,937,080, which are herein incorporated by reference.

Referring back to FIG. 1, a segmented portion (SP) may be removed from the conveyor 12 either manually, or automatically using the pickup device 24. For the purpose of automatic removal, the computer 18 tracks not only the location of the workpiece (WP) as described above, but also the location of the segmented portion (SP) after the segmented portion (SP) leaves the cutter 22 along the conveyor 12. The known location of the segmented portion (SP) can then be used to control the pickup device 24 to automatically remove the segmented portion from the conveyor 12.

The pickup device 24 includes an attachable portion 74 adapted for a secure attachment with a segmented portion (SP), and can operate to lift up the segmented portion from the conveyor 12 and carry the segmented portion laterally relative to the direction of movement of the conveyor 12. The segmented portion may then be discarded or deposited onto a separate take-away conveyor (not shown) extending therefrom to be transported to a desired location for discard or further processing. Detailed description of a pickup device suitable for use in the present invention is disclosed in copending U.S. patent application Ser. No. 09/619,423, filed Jul. 19, 2000 and commonly assigned, which is explicitly incorporated herein. In one embodiment, the attachable portion 74 of the pickup device 24 utilizes suction action to grasp a segmented portion (SP).

When picking up a segmented portion (SP), it is often desirable to restrain the rest of the workpiece (WP) downwardly against the conveyor 12 so that the segmented portion (SP) may be easily separated from the rest of the workpiece to be carried away by the pickup device 24. To this end, a holddown device 76 having a restraining blade 78 may be further provided. The computer 18 controls the movement of the holddown device 76 based on the known location of the workpiece (WP) to keep the workpiece in place on the conveyor 12, while controlling the pickup device 24 to remove the segmented portion (SP) from the conveyor. Detailed description of a holddown device suitable for use in the present invention is also included in the above-mentioned copending U.S. patent application Ser. No. 09/619,423, filed Jul. 19, 2000 and commonly assigned.

Figure 7:
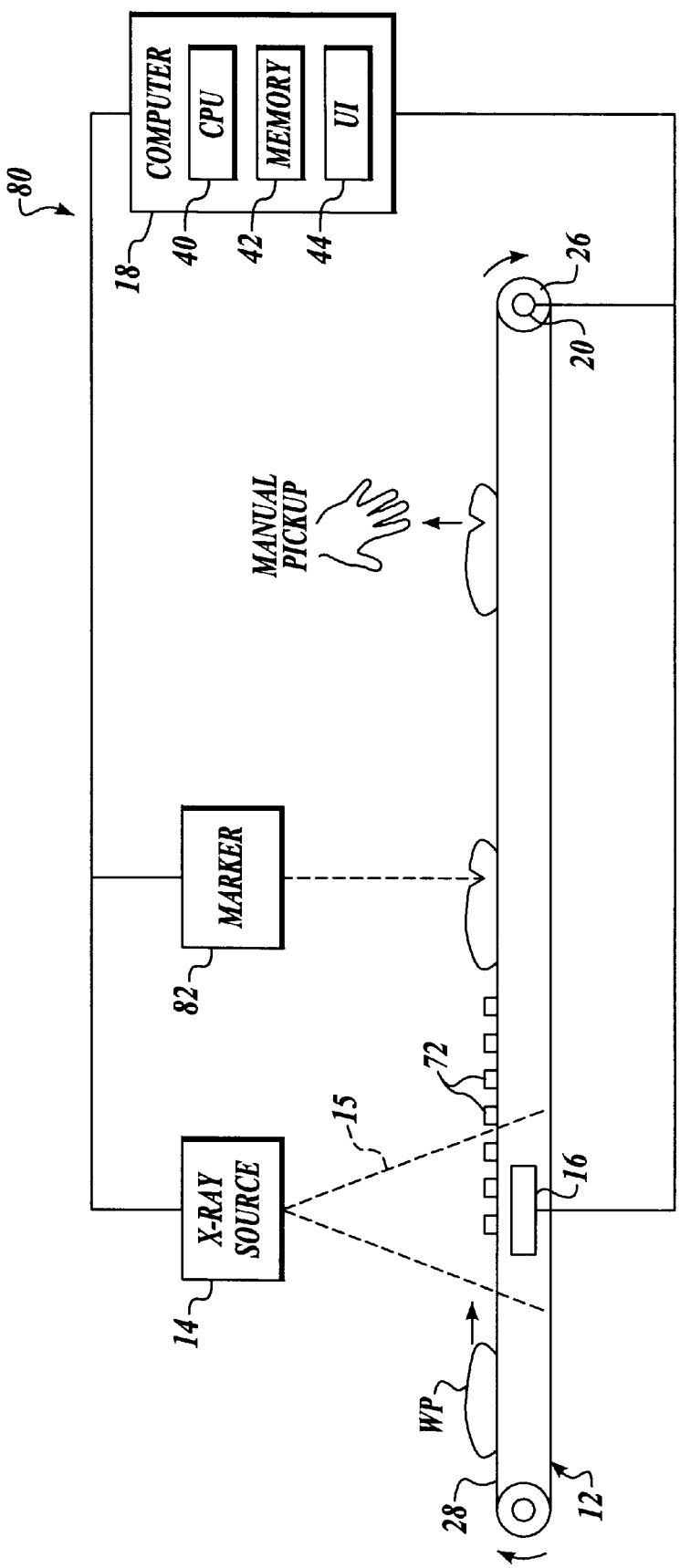
FIG. 7 is a schematic representation of a second embodiment of an apparatus and method for detecting and removing undesirable material from workpieces in accordance with the present invention.

FIG. 7 illustrates a second embodiment of a method and system for detecting and removing undesirable material from workpieces, in accordance with the present invention. In the following description, the same components included in various embodiments are noted with the same reference numbers. As in the first embodiment, a detection apparatus 80 of the second embodiment includes a conveyor 12, an x-ray source 14, and an x-ray detector array 16. A computer 18 is provided to control the conveyor 12 and receives signals from the x-ray detector array 16. The computer 18 may further control the operation of the x-ray source 14. Also as before, a position sensor, such as a rotary encoder 20 or markings 72 impervious to the scanning radiation, is provided so that the computer 18 can track the location of a workpiece as it is carried on the conveyor 12. The detection apparatus 80 further includes a marker 82, for example a high-speed water jet, which is also controlled by the computer 18.

In operation, as before, the detection apparatus 80 first detects the existence and location of any undesirable material in a workpiece (WP) carried on the conveyor 12 using the x-ray source 14 and the x-ray detector array 16. Once undesirable material is detected, the computer continues to track the location of the workpiece (WP) including undesirable material as the workpiece is transported on the conveyor 12. When the workpiece arrives at the reach of the marker 82, the computer 18 activates the marker 82 to mark the workpiece with a visually recognizable sign. For example, a high-speed water jet may be used as the marker 82 to cut out a V-shaped notch off the workpiece. Alternatively, a dye marker may be used to stain the workpiece. Thereafter, a worker stationed downstream of the marker 82 along the conveyor 12 may easily spot these marked workpieces containing undesirable material and manually offload them from the conveyor 12 for further processing. A worker may deposit the removed workpieces onto a separate take-away conveyor (not shown) extending to a desired location, where a skilled worker may manually remove any undesirable material from these workpieces.

Figure 8:
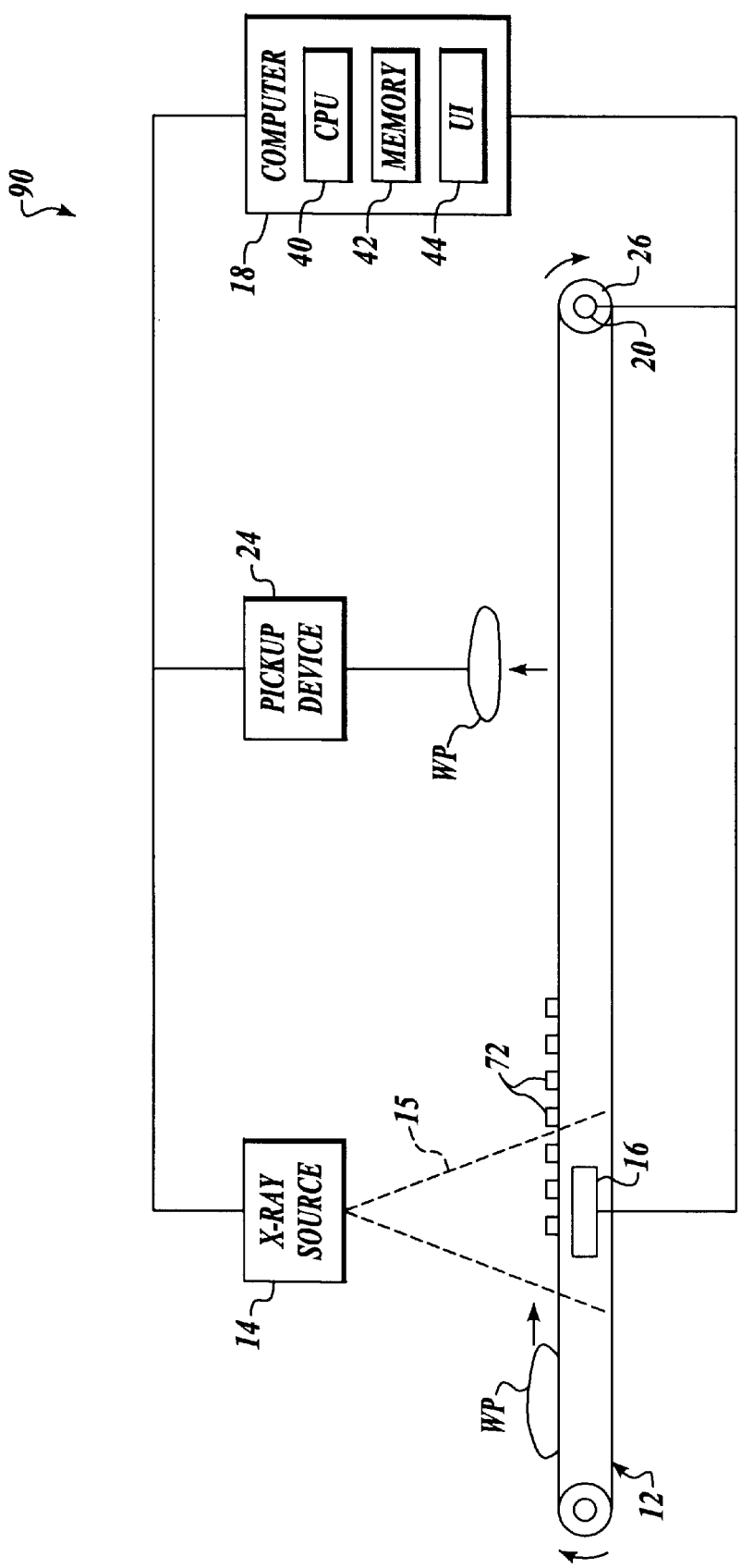
FIG. 8 is a schematic representation of a third embodiment of an apparatus and method for detecting and removing undesirable material from workpieces in accordance with the present invention.

FIG. 8 is a schematic representation of a third embodiment of an apparatus and method for detecting and removing undesirable material from workpieces in accordance with the present invention. As with other embodiments, a detection apparatus 90 of the third embodiment includes a conveyor 12, an x-ray source 14, an array of x-ray detectors 16, and a computer 18. The detection apparatus 90 further includes a pickup device 24 under the control of the computer 18. Still further, the detection apparatus 90 includes a position sensor, such as a rotary encoder 20 or markings 72 impervious to the scanning radiation, for tracking the location of workpieces being processed on the conveyor 12.

In operation, a workpiece (WP) is placed adjacent the x-ray source 14 and the existence of any undesirable material in the workpiece is detected using the x-ray detector array 16. After undesirable material is detected, the computer 18 continues to track the location of the workpiece (WP) containing the undesirable material. Once the workpiece comes within the reach of the pickup device 24 along the conveyor 12, the computer 18 activates the pickup device 24 to automatically remove the workpiece from the conveyor 12. The pickup device 24 can then deposit the workpiece onto a separate take-away conveyor (not shown) extending therefrom to transport the workpiece to a desired location, where a skilled worker may manually remove the undesirable material from the workpiece.

The three embodiments of the system of the present invention described above in reference to FIGS. 1, 7, and 8 share many common components, and therefore these three embodiments may advantageously be incorporated into one system. In such case, a user will select a desired embodiment of the system to be activated, using the user interface 44 of the computer 18.

According to the present invention, once undesirable material is located within a workpiece, either the undesirable material is segmented into a simple, visually recognizable shape, or the workpiece is marked with a visually recognizable sign. This aspect of the invention is quite advantageous because it significantly reduces the mental and physical burden on a worker in sorting and removing the segmented portion or the workpiece from the conveyor for further processing. Furthermore, according to the present invention, the segmented portion or the workpiece including undesirable material may be automatically removed from the conveyor using a pickup device. The automatic removal system eliminates the need for manual labor in sorting and removing workpieces, which is desirable especially when the workpiece processing is carried out in an adverse, cold-temperature environment.

While several embodiments of the invention have been illustrated and described, it will be appreciated that various changes can be made therein without departing from the spirit and scope of the invention.

The embodiments of the invention in which an exclusive property or privilege is claimed are defined as follows:

1. A method of detecting material desired to be removed from a workpiece that is carried on a conveyor, the method comprising the steps of:
    (a) positioning the workpiece adjacent a scanner;
    (b) scanning the workpiece;
    (c) determining the existence of undesirable material in the workpiece based on the scanning of the workpiece; and
    (d) if it is determined that undesirable material exists in step (c), cutting out a portion of the workpiece that contains the undesirable material into a visually distinguishable shape.

2. The method of claim 1, wherein the scanner comprises an x-ray source, and step (c) comprises detecting an attenuation of the x rays after the x rays have passed through the workpiece and determining existence of undesirable material based on the detected attenuation of the x rays.

3. The method of claim 1, wherein the workpiece is divided into an array of volume elements, existence of undesirable material being determined for each of the volume elements.

4. The method of claim 1, wherein step (b) further comprises:
    (i) scanning a slice of the workpiece;
    (ii) advancing the workpiece on the conveyor by a thickness of the slice past the scanner; and
    (iii) repeating steps (i) and (ii) until the entire workpiece is scanned.

5. The method of claim 1, wherein step (d) is performed using a cutter selected from the group consisting of a high-speed water jet, a laser, a rotary saw, a hacksaw, a guillotine, and a bandsaw.

6. The method of claim 1, wherein step (d) comprises cutting out a portion into a visually distinguishable shape selected from the group consisting of round, triangular, and square shapes.

7. The method of claim 1, wherein step (d) further comprises the step of manually offloading the segmented portion having a visually distinguishable shape from the conveyor.

8. The method of claim 1, wherein the scanner comprises an x-ray source and a camera, the method further comprises the step of determining the thickness of the workpiece, and wherein step (c) further comprises:
    (i) in a portion of the workpiece determined to have a thickness above a predetermined value, detecting an attenuation of the x rays after the x rays have passed through the workpiece and determining existence of undesirable material based on the detected attenuation of the x rays; and
    (ii) in a portion of the workpiece determined to have a thickness below a predetermined value, examining an image of the workpiece taken by the camera to determine existence of undesirable material.

9. The method of claim 8, wherein the step of determining the thickness of the workpiece is performed based on the detected attenuation of the x rays.

10. The method of claim 8, wherein the step of determining the thickness of the workpiece is performed based on the image of the workpiece taken by the camera.

11. The method of claim 8, wherein the camera is selected from a group consisting of a charge-coupled device (CCD) camera, a charge injection device (CID) camera, and an infrared camera.

12. A method of detecting material desired to be removed from a workpiece that is carried on a conveyor, the method comprising the steps of:
    (a) positioning the workpiece adjacent an X-ray source that generates X-rays;
    (b) exposing the workpiece to X-rays;
    (c) detecting an attenuation of the X-rays after the X-rays have passed through the workpiece;
    (d) determining the existence of undesirable material in the workpiece based on the detected attenuation of the X-rays; and
    (e) if it is determined that undesirable material exists in step (d), segmenting a portion that contains the undesirable material from the workpiece, tracking a position of the segmented portion containing the undesirable material, and automatically offloading the segmented portion from the conveyor using a pickup device based on the tracked location of the segmented portion.

13. The method of claim 12, wherein step (b) further comprises:
    (i) exposing a slice of the workpiece to the x rays;
    (ii) advancing the workpiece on the conveyor by a thickness of the slice past the x-ray source; and
    (iii) repeating steps (i) and (ii) until the entire workpiece is exposed to the x rays.

14. The method of claim 12, wherein step (e) is performed using a cutter selected from the group consisting of a high-speed water jet, a laser, a rotary saw, a hacksaw, a guillotine, and a bandsaw.

15. The method of claim 12, wherein the step of tracking a position is performed using a rotary encoder attached to a conveyor roller.

16. The method of claim 12, wherein the step of tracking a position is performed using a series of markings impervious to the x rays provided along the length of the conveyor at intervals.

17. The method of claim 12, wherein the pickup device is capable of moving laterally relative to the direction of movement of the conveyor.

18. The method of claim 17, wherein the pickup device employs suction action to pick up the segmented portion.

19. A system for detecting material desired to be removed from a workpiece that is carried on a conveyor, the system comprising:
   (a) an x-ray source;
   (b) a camera;
   (c) a conveyor for carrying a workpiece past the x-ray source and the camera;
   (d) an x-ray detector positioned to receive x rays that were emitted by the x-ray source and passed through the workpiece, the x-ray detector generating a scanning signal corresponding to an intensity of the x rays impinging upon the x-ray detector; and
   (e) a processor loaded with computer-executable instructions for performing the steps of:
      (i) receiving the scanning signal and the image of the workpiece;
      (ii) determining a thickness of the workpiece;
      (iii) in a portion of the workpiece determined to have a thickness above a predetermined value, determining existence of undesirable material in the workpiece based on the scanning signal received from the detector; and
      (iv) in a portion of the workpiece determined to have a thickness below a predetermined value, determining existence of undesirable material in the workpiece based on the image of the workpiece taken by the camera.

20. The system of claim 19, wherein the x-ray detector comprises a layer of scintillator material and a plurality of photodiodes.

21. The system of claim 19, wherein the x-ray detector comprises a fluoroscope screen and a video camera.

22. The system of claim 19, wherein the x-ray detector comprises a direct x-ray imaging array of amorphous selenium detectors.

23. The system of claim 19, wherein step (e)(ii) of determining a thickness of the workpiece is performed based on the scanning signal received from the detector.

24. The system of claim 19, wherein step (e)(ii) of determining a thickness of the workpiece is performed based on the image of the workpiece taken by the camera.

25. The system of claim 19, wherein the camera is selected from a group consisting of a charge-coupled device (CCD) camera, a charge injection device (CID) camera, and an infrared camera.

26. A system for detecting material desired to be removed from a workpiece that is carried on a conveyor, the system comprising:
   (a) a scanner;
   (b) a conveyor for carrying a workpiece past the scanner;
   (c) a position sensor for generating a position signal indicative of a position of the workpiece;
   (d) a detector for generating a scanning signal indicative of the result of scanning;
   (e) a pickup device comprising an attachment portion attachable to a workpiece; and
   (f) a processor loaded with computer-executable instructions for performing the steps of:
      (i) receiving the position signal and the scanning signal;
      (ii) determining the position of the workpiece exposed to the scanner based on the received position signal;
      (iii) determining existence of undesirable material in the workpiece based on the scanning signal received from the detector; and
      (iv) if it is determined that undesirable material exists in step (iii), controlling the pickup device to remove the workpiece from the conveyor.

27. The system of claim 26, wherein the scanner comprises an x-ray source and the detector comprises an x-ray detector positioned to receive x rays that were emitted from the x-ray source and passed through the workpiece, the x-ray detector generating a scanning signal corresponding to an intensity of the x rays impinging upon the x-ray detector.

28. The system of claim 27, wherein the x-ray detector comprises a layer of scintillator material and a plurality of photodiodes.

29. The system of claim 27, wherein the x-ray detector comprises a fluoroscope screen and a video camera.

30. The system of claim 27, wherein the x-ray detector comprises a direct x-ray imaging array of amorphous selenium detectors.

31. The system of claim 26, wherein the attachment portion of the pickup device attaches to a workpiece by suction action.

32. The system of claim 26, wherein the position sensor comprises a rotary encoder attached to a conveyor roller.

33. The system of claim 26, wherein the position sensor comprises a series of markings impervious to the x rays arranged along the length of the conveyor at intervals.

* * * * *

UNITED STATES PATENT AND TRADEMARK OFFICE
CERTIFICATE OF CORRECTION

PATENT NO. : 6,563,904 B2
DATED : May 13, 2003
INVENTOR(S) : C. C. Wijts et al.

It is certified that error appears in the above-identified patent and that said Letters Patent is hereby corrected as shown below:

<u>Title page,</u>
Item [75], Inventors, "Arthur W. Vogeley, Seattle" should read
-- Arthur W. Vogeley, Jr., Seattle --

Signed and Sealed this

Twenty-eighth Day of October, 2003

JAMES E. ROGAN
*Director of the United States Patent and Trademark Office*